March 2, 1948.　　　　P. DANIELSSON　　　　2,437,081
FISH DRESSING MACHINE
Filed July 10, 1944　　　　2 Sheets-Sheet 1

Inventor
Paul Danielsson,
By Sommers & Young
Attorneys

March 2, 1948.　　P. DANIELSSON　　2,437,081
FISH DRESSING MACHINE
Filed July 10, 1944　　2 Sheets-Sheet 2

Inventor
Paul Danielsson,
By Sommers & Young
Attorneys

Patented Mar. 2, 1948

2,437,081

UNITED STATES PATENT OFFICE 2,437,081

FISH DRESSING MACHINE

Paul Danielsson, Stora Essingen, Sweden, assignor to Arenco Aktiebolag, Stockholm, Sweden, a joint-stock company of Sweden Application July 10, 1944, Serial No. 544,204
In Sweden July 13, 1943

1 Claim. (Cl. 17—3)

This invention relates to improvements in fish dressing machines and more particularly to means for adjusting the fish longitudinally into correct positions relative to means for dressing the fish, such as decapitating or eviscerating means. Such adjustment has hitherto been effected by mechanical or hydraulic driving means, such as a movable brush or a jet of water acting on the fish. Such means are, however, affected with certain drawbacks. The brush will be coated with slimy impurities so that it will rapidly be ineffective, and the use of a jet of water requires the arrangement of a pump and a supply of water.

It is an object of the invention to obviate these drawbacks by the provision of simple and efficient means acting transversely on the body of the fish to obtain the desired displacement. Another object of the invention consists in the provision of simple and efficient means to effect the desired displacement by utilizing the characteristic shape of fish. Still another object of the invention consists in the provision of very simple immovable means coacting with the ordinary fish feeding means to effect the desired displacement.

With these and other objects in view, as will appear hereinafter, my invention consists of certain novel features of construction, combination and arrangements of parts, as will be hereinafter described and particularly set forth in the claims hereunto appended.

Figures 3, 4:
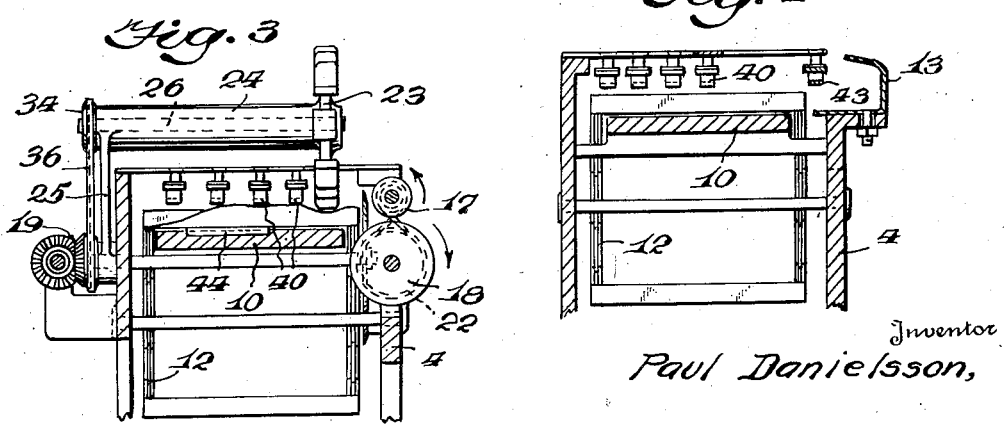
Figs. 3 and 4 are elevational sectional views on the lines III—III and IV—IV, respectively, of Fig. 1.

Referring to the drawings, the machine has a fish conveyor 1 consisting of a pair of endless chains 12 and transverse impellers 11 connected to the chains. The chains 12 run over a driving sprocket 2 and an idle sprocket 3. The sprocket 2 is secured to a shaft 5 which is rotatably journalled in the machine frame 4 and is driven by means of a bevel gear 6 driven by a shaft 7. The fish are by the impellers 11 fed transversely upon a table 10. A gauge plate 13 and a circular cutter 14 are positioned at one side of the conveyor 1. The gauge plate 13 is adjustable transversely to the conveyor 1 and the cutter 14 is secured to a rotary shaft 15. The shaft 15 is by means of a bevel gear 16 driven by the shaft 7. Sequently to the cutter 14 and at the same side of the conveyor 1 are mounted two eviscerating rollers 17 and 18. The lower roller 18 is driven by the shaft 7 by means of a bevel gear 19, a shaft 20, and another bevel gear 21. The upper roller 17 is driven by the lower roller 18 by means of a crossed rope 22, so that both the rollers rotate continuously and at the same peripheral velocities but in opposite directions, as indicated by arrows in Fig. 3.

Opposite to the roller 17 and above the conveyor 1 a press wheel 23 is secured to a rotary shaft 26 journalled in a hub 24 of an arm 25. The arm 25 is loosely journalled on the shaft 15 and provided with a downwardly projecting rear extension 27 which by a tension spring 28 is connected to the machine frame 4. Another tension spring 29 connects the upper part of the arm 25 with the machine frame 4. A chain 36 runs over a sprocket 34 secured to the shaft 26 and over another sprocket 35 secured to the shaft 15, so that the shaft 15 drives the shaft 26. The press wheel 23 is provided with a plurality of circumferential press heads 30 the pressing surfaces of which are spherical, flat or consist of cylindrical segments. The press power of the heads 30 upon the body of the fish can be increased or decreased by adjustment of nuts 32 and 33 to vary the tension of the springs 28 and 29.

Figure 1:
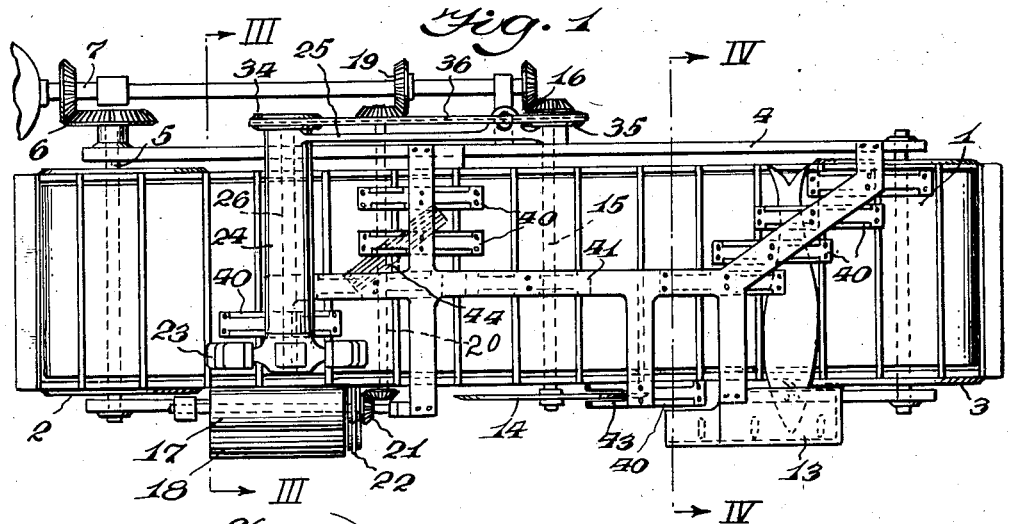
Figs. 1 and 2 are a plan view and an elevational side view, respectively, of the fish dressing machine embodying the invention.
Figure 2:
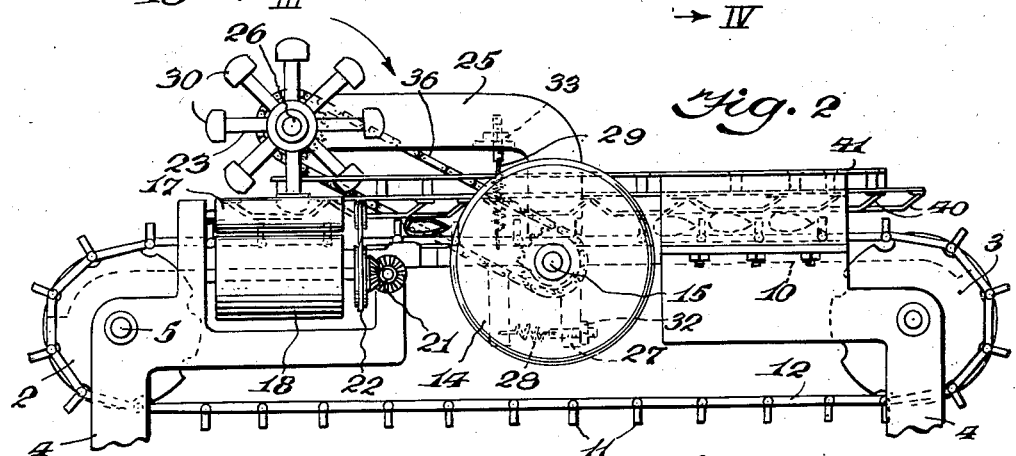
Figure 5:
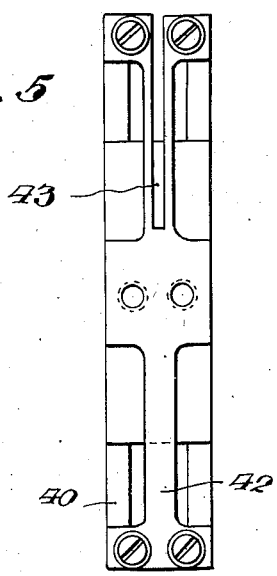
Figs. 5 and 6 are a plan and a side view, respectively, on an enlarged scale of a constructional feature of the machine.
Figure 6:
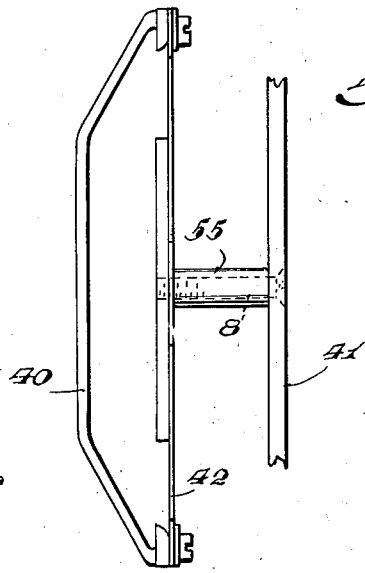
Figure 7:
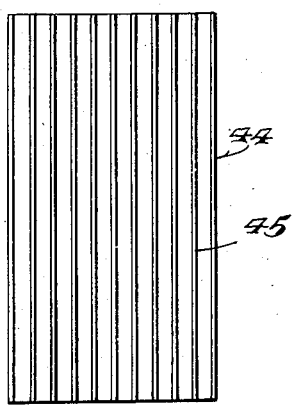
Figs. 7 and 8 are a plan view and an end view, respectively, on an enlarged scale, of another constructional feature of the machine.
Figure 8:
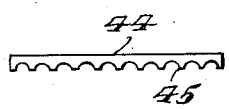

Above the conveyor impellers 11 a plurality of upwardly yielding bars 40 extend longitudinally of the conveyor 1. As shown to the right in Fig. 1, four yielding bars 40 are positioned so that they have a successive relative displacement transversely as well as longitudinally of the conveyor 1. Sequently to the four staggered bars 40 when viewed in the fish feeding direction the cutter 14 projects into a groove 43 (Fig. 5) of still another similar bar 40. To the conveyor table 10 is secured an obliquely positioned plate 44 (Figs. 7 and 8) which has longitudinal ridges 45 in its upper face. Above the plate 44 still another pair of similar upwardly yielding bars 40 are mounted on the beam 41 and directed longitudinally of the conveyor 1, so that they will press the advancing fish against the plate 44. The impellers 11 of the conveyor 1 can freely pass through the interspace between the plate 44 and the bars 40 positioned above same. Above the conveyor 1, closely in front of the press wheel 23, still another similar upwardly yielding bar 40 is secured to the beam 41. As shown in Figs. 5 and 6, each bar 40 is connected to a blade spring 42 which by means of a rod 55 and a screw 8 is secured to a beam 41 which in turn is secured to the machine frame 4 (Figs. 1 and 2).

In the operation of the machine fish of different sizes are at the right hand end of the machine (Fig. 1) positioned on the table 10 each in one of the compartments formed between the impellers 11. The fish, when being fed transversely by the conveyor 1, are first introduced into the interspace between the table 10 and the four staggered plates 40 which will exert yielding pressure upon the fish so that the fish due to their tapered shapes will slide on the table 10 in their longitudinal directions, viz. transversely of the conveyor 1 against the gauge plate 13. The rearmost bar 40 (the uppermost one in Fig. 1) will press against the tapering rear portion of a big fish and the next bar 40 will press against a tapering portion of the same fish somewhat nearer its head end or against a portion of a smaller fish nearer the tail end of the latter, and so on. By this pressing action upon their tapering bodies the fish will rapidly slide longitudinally against the gauge plate 13 simultaneously as it is fed transversely by the conveyor 1. The displacement of the fish against the gauge plate 13 will even take place so effectively that particularly soft fish might be bent somewhat when their heads abut the gauge plate 13. Such fish are, however, straightened when they are fed beneath the bar 40 positioned at the cutter 14 as said bar will depress the fish on displacing their tail ends slightly rearwardly immediately before the fish are decapitated by the cutter 14. The fish thus having been decapitated is by the conveyor 1 fed further transversely into operative position relative to the eviscerating rollers 17 and 18, which pull the viscera out of the cut head end of the fish. To enable the rollers 17 and 18 to catch the viscera, part thereof is by the heads 30 of the press wheel 23 first squeezed out of the cut head end of the fish so that the protruding part of the viscera enters the gap between the rollers 17 and 18. In order to enable this the head end of the fish should be positioned as near the rollers 17 and 18 as possible. Therefore, prior to the squeezing action the position of the fish is adjusted somewhat by means of the two yielding bars 40 positioned above the obliquely positioned guide plate 44, which bars act upon the fish in the manner as described heretofore to displace the fish longitudinally towards the rollers 17 and 18. This displacement is controlled by the ridges 45 of the plate 44. When rollers 17 and 18 pull the viscera out of the fish the yielding bar 40 at the press wheel 23 retains the fish, and thereby valuable roe and milt not adhering to the intestine will remain within the body of the fish.

I claim:

In a fish dressing machine, a conveyor for feeding the fish laterally, and a plurality of yielding members disposed above and extending longitudinally of said conveyor and having a successive relative displacement transversely as well as longitudinally of said conveyor to successively and yieldingly engage the upper side of a fish passing beneath them and displace the fish longitudinally by jamming over the tapered rear portion of the body of the fish.

PAUL DANIELSSON.

REFERENCES CITED

The following references are of record in the file of this patent:

UNITED STATES PATENTS

| Number | Name | Date |
|---|---|---|
| 1,642,444 | Hovden | Sept. 13, 1927 |
| 1,693,570 | Vale | Nov. 27, 1928 |
| 1,909,643 | Waugh | May 16, 1933 |
| 2,208,645 | Savrda | July 23, 1940 |
| 2,322,831 | Danielsson | June 29, 1943 |
| 2,346,935 | Oates | Apr. 18, 1944 |